(No Model.)

G. A. RAMSEYER.
PIANO STOOL.

No. 249,991. Patented Nov. 22, 1881.

WITNESSES:
Theo. G. Hoster
C. Sedgwick

INVENTOR:
G. A. Ramseyer
BY Munn & Co
ATTORNEYS.

UNITED STATES PATENT OFFICE.

GEORGE A. RAMSEYER, OF DOBBS FERRY, NEW YORK.

PIANO-STOOL.

SPECIFICATION forming part of Letters Patent No. 249,991, dated November 22, 1881.

Application filed June 24, 1881. (No model.)

*To all whom it may concern:*

Be it known that I, GEORGE A. RAMSEYER, of Dobbs Ferry, in the county of Westchester and State of New York, have invented a new and useful Improvement in Piano-Stools, of which the following is a specification.

Figure 1:
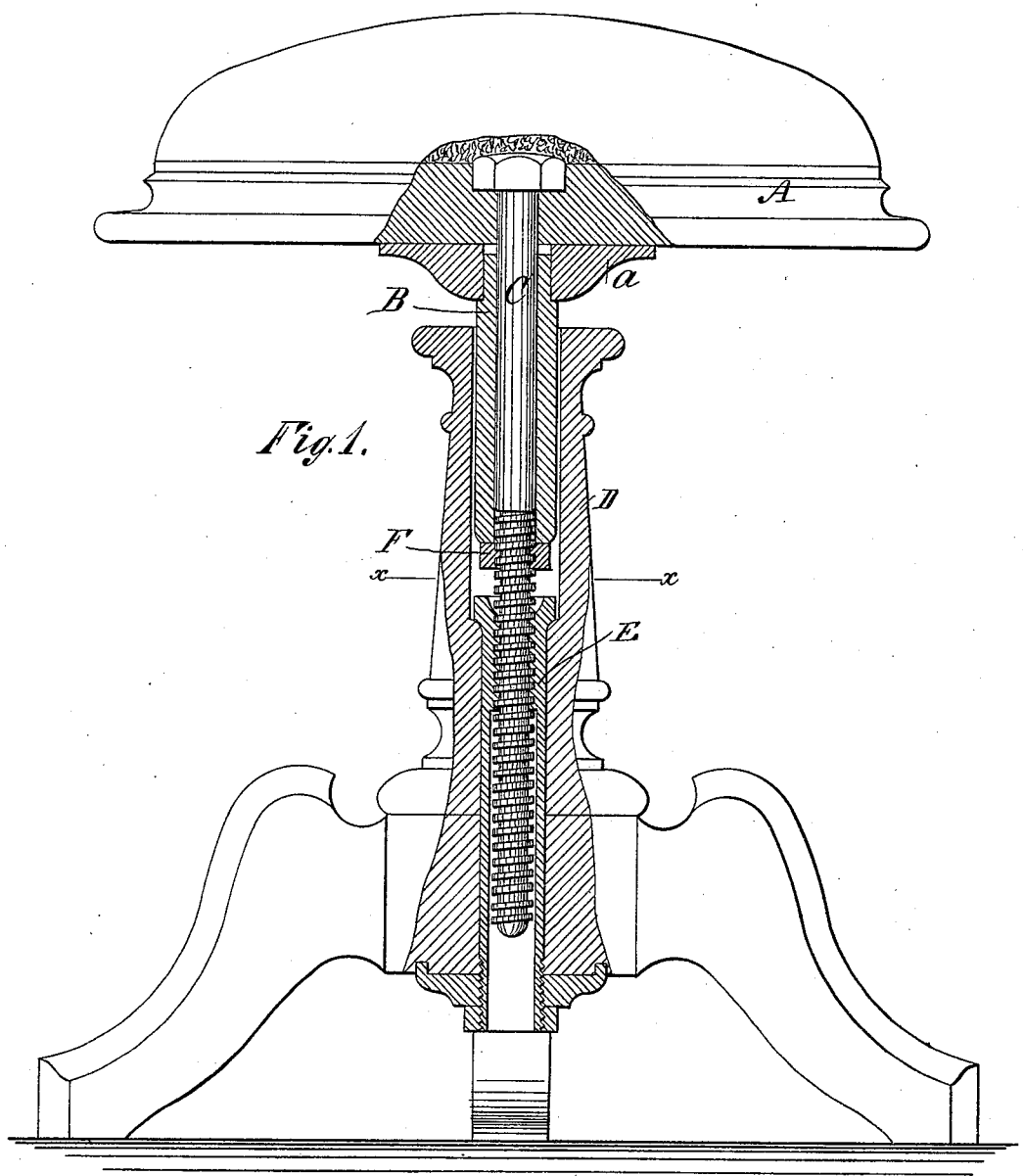
Figure 2:
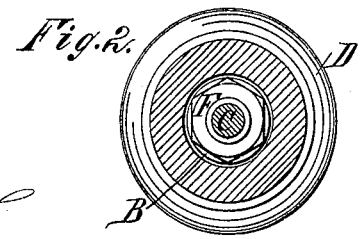

In the accompanying drawings, Figure 1 is a central vertical section of a piano-stool embodying my invention, and Fig. 2 is a horizontal section on line $x$ $x$ of Fig. 1.

Similar letters of reference indicate corresponding parts.

My invention relates to the mode of securing the elevating-screw and guide to the seat, and has for its object to obtain a firm and durable connection and a saving in the expense of manufacture.

Heretofore the screw has been secured by a flange or plate attached by wood-screws to the under side of the seat.

In my improvement I use a headed screw, which extends through the seat, and by a nut placed on the screw the parts are securely clamped.

Referring to the drawings, A is the seat. C is the screw; B, the guide or piston around the screw. D is the supporting-leg; and E is the screw-socket, fitted in the leg in the usual manner, for receiving the screw.

The screw C is a headed screw-bolt extending through the seat-bottom, so that the head rests on the upper side.

Between a shoulder on the upper end of guide B and the under side of the seat is a collar, $a$, and below the guide a nut, F, is fitted on the screw, which nut being screwed tightly, the head of screw C is drawn tight, and the seat-bottom clamped between the head and the collar $a$. The collar is not, however, essential, as the upper end of guide B may take against the under side of the seat.

This construction gives a rigid and durable connection of the elevating-screw and seat. There are no wood-screws to work loose by strain, and the screw, being a bolt of ordinary construction, is much cheaper than the special screw heretofore used.

Having thus fully described my invention, I claim as new and desire to secure by Letters Patent—

The combination of the base provided with a nut, E, and a plain bore above said nut, with the seat A, the headed adjusting-screw C, the washer $a$, the sleeve or tube B, and the nut F, substantially as and for the purpose specified.

GEORGE A. RAMSEYER.

Witnesses:
GEO. D. WALKER,
C. SEDGWICK.